June 12, 1928.

E. SCHÜRER 1,673,208

METHOD OF MANUFACTURING UNIFORMLY LOADED CONDUCTORS USED FOR SIGNALING PURPOSES

Filed Aug. 13, 1925 c Magnetisable material
b Soluble strip of paper
a Copper c' Magnetisable material
a' Copper E. Schürer
INVENTOR By Marks & Clerk
Attys Patented June 12, 1928.

1,673,208

UNITED STATES PATENT OFFICE.

EUGEN SCHÜRER, OF COLOGNE-MULHEIM, GERMANY, ASSIGNOR TO FELTEN AND GUILLEAUME CARLSWERK ACTIEN GESELLSCHAFT, OF COLOGNE-MULHEIM, GERMANY.

METHOD OF MANUFACTURING UNIFORMLY-LOADED CONDUCTORS USED FOR SIGNALING PURPOSES.

Application filed August 13, 1925, Serial No. 50,145, and in Germany December 18, 1924.

This invention relates to a method of manufacturing uniformly loaded conductors.

It has been proposed to interpose a thin layer of material containing carbon, such as for example paper, when winding the loading strip on to the actual conductor. By this means when the conductor is annealed, the burning of the layer causes sufficient space to be left for the copper to expand, thus avoiding tension in the loading strip. This method has the disadvantage that the magnetizable materials may absorb carbon. If this drawback is avoided by substituting a layer of inorganic substance for that containing carbon, the material forming the layer combines with the copper or the magnetizable substance thus affecting the mechanical and electrical properties of the conductor.

It has been proposed in patent application Serial Number 50,144, filed August 13, 1925, to coat the actual conductor of signaling lines loaded uniformly with a highly permeable material, before the latter is applied, with a layer of lac, the latter being removed by a solvent after the loading material has been wound on the conductor, for the purpose of avoiding the undesirable tension in the loading material which otherwise occurs owing to the copper expanding to a greater extent. As a matter of fact when this method is employed, a very highly permeable loading material is obtained.

On the other hand it is a very lengthy and difficult operation to apply the lac in a sufficiently uniform layer to the conductor.

Figure 1:
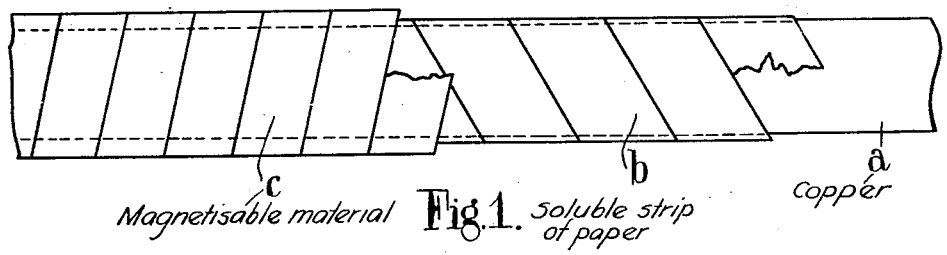
Figure 2:
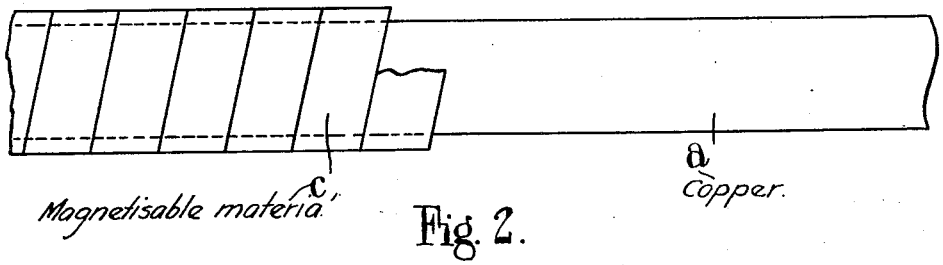

The object of the present invention is to provide an improved method which obviates this drawback. According to the invention, instead of coating the actual conductor with one of the lacs containing celluloid proposed in the patent application above referred to, a strip made of cellulose ester or cellulose ether is wound tightly around the conductor and after the loading material is placed thereon, this strip is dissolved by placing the conductor in a suitable solvent such as for instance amyl acetate, acetone and the like. The conductor is then annealed in a known manner. The invention will be better understood by reference to the accompanying drawings, in which Figure 1 illustrates a conductor around which the soluble strip is wound, and Figure 2 shows the same conductor after the said strip has been dissolved. In these figures $a$ is the copper conductor, $b$ the strip of cellulose ester, cellulose ether or equivalent material and $c$ is the loading material which consists of a ferro-magnetic substance.

In comparison with the method forming the subject matter of the patent application referred to the present invention has the advantage that it enables the intermediate layer to be quickly and uniformly applied without detracting from the advantage referred to in the said patent application, viz, removing the intermediate layer by dissolving without using heat.

According to a further feature of the invention, use is made of paper as intermediary layer in place of the expensive celluloid-like substances and the paper is dissolved out by cupric oxide ammonia or a similar solvent in an atmosphere free from oxygen.

Finally the invention is not limited to the use of the substances referred to as intermediary layers, but any material which can be obtained in the form of a strip may be employed for this purpose, provided it is soluble in a liquid which does not affect either the copper or the loading material.

What I claim is:—

1. A method of manufacturing uniformly loaded conductors used for signaling purposes, consisting in tightly winding round the conductor a strip made of a substance which is soluble in a liquid which does not attack either copper or the loading material, surrounding the conductor with the loading material, placing it into a liquid which dissolves the strip and finally annealing the conductor and loading material.

2. A method of manufacturing uniformly loaded conductors used for signaling purposes, consisting in tightly winding round the conductor a strip made of paper, surrounding the conductor with the loading material, placing it in a solvent to dissolve the paper strip, and finally annealing the conductor and loading material.

3. A method of manufacturing uniformly loaded conductors used for signaling purposes, consisting in tightly winding round the conductor a strip made of paper, surrounding the conductor with the loading material, placing it in cupric oxide ammonia to dissolve the paper strip, and finally annealing the conductor and loading material.

In testimony whereof I have signed my name to this specification.

EUGEN SCHÜRER.